Patented Sept. 12, 1933

1,926,769

UNITED STATES PATENT OFFICE 1,926,769

SULPHONATED OIL COMPOUND

Anthony James Hailwood, Altrincham, and Richard Patrick McGlynn, Crumpsall, England, assignors to Imperial Chemical Industries Limited, a corporation of Great Britain No Drawing. Application September 4, 1931, Serial No. 561,300, and in Great Britain September 10, 1930

19 Claims. (Cl. 87—12)

This invention relates to carbon compounds and processes for their production. More particularly it relates to the products resulting from the treatment of oils containing highly unsaturated carbon compounds with oxidizing agents and to the products resulting from the sulphonation of the products produced by the treatment with oxidizing agents.

This invention has for an object the production of new chemical compounds, new chemical processes, new derivatives of highly unsaturated carbon compounds, new oxidation products, new sulphonation products and in general an advancement of the art. Other objects will appear hereinafter.

The above objects are accomplished by the treatment of highly unsaturated compounds with oxidizing agents and the treatment of the resultant products with sulphuric acid.

The invention will be further understood from a consideration of the following examples in which the parts are given by weight:

Example I

One hundred (100) parts of Japanese fish oil (of iodine value 172) were mixed with 400 parts of glacial acetic acid and 100 parts of hydrogen peroxide (20 vols.). The mixture was stirred and heated at 95° C. for four hours after which the resultant oil product was separated by decantation (distillation has also been found satisfactory for this step) and washed with water until free from acid.

Example II

One hundred (100) parts of Japanese fish oil (probably chiefly herring oil and having an iodine value of 172) were mixed with 100 parts of hydrogen peroxide (20 vols.) and 40 parts of glacial acetic acid and the resultant stirred and heated for four hours at about 95° C. The resultant product was then boiled until the water present was removed by the distillation. Thereafter the boiling was continued under refluxing conditions for two hours after which the excess of acetic acid was removed by distillation. To the oily residue of this distillation 30 parts of 20% "oleum" were added with stirring while the temperature was maintained at 17-20° C. Stirring was continued at this temperature until a sample of the mixture dissolved freely in water, after which the entire mixture was poured into 400 parts of ice cold water, the oil separated and rendered neutral by the addition of concentrated aqueous caustic soda.

Example III

One hundred (100) parts of linseed oil were mixed with 200 parts of glacial acetic acid and 10 parts of hydrogen peroxide (100 vols.). The mixture was stirred and heated at 95° C. for four hours. The resultant product after being poured into water was washed free from acid and dried.

Example IV

One hundred (100) parts of linseed oil were mixed with 200 parts of glacial acetic acid and 10 parts of hydrogen peroxide (100 vols.). The mixture was stirred and heated for four hours at 95° C. as described in Example III. The temperature of the reaction mixture was then raised to 100° C. and the water removed by distillation. The heating was then continued for two hours longer at 119° C. under refluxing conditions. The excess of acetic acid was removed by distillation.

To the product so obtained 30 parts of acetic anhydride were added and the mixture sulphonated by slowly adding 30 parts of 20% "oleum" at 17-20° C. The product was isolated by the procedure set out in Example II.

In the above examples the treatment with acetic acid has been carried on simultaneously with the oxidation by means of hydrogen peroxide. This step in the process may be modified by treating with acetic acid prior or subsequently to the oxidation with hydrogen peroxide.

Other sulphonating agents than the oleum of the above examples may be used if desired. In certain instances it is desirable to carry out the sulphonation in the presence of an auxiliary agent, that is, a solvent or suspension agent, for example, carbon tetrachloride. When desired a catalytic agent for example, pyridine, may also be present during the sulphonation. The treatment with the acid anhydride prior to the sulphonation is not limited to the acetic anhydride of Example IV. In general, any ester forming acid anhydride may be used.

In its broadest aspect the invention contemplates the treatment of oily material comprising compounds including highly unsaturated fatty acid radicals. These radicals may occur in combinations involving the acid itself or esters thereof. As examples of animal oils which may be advantageously treated according to this invention may be mentioned, fish oils, which contain clupadonic acid, herring oil and the like. Examples of vegetable oils include tung oil, which contains elaeostearic acid, linseed oil, soya bean oil and the like. The processes of this invention may be carried out upon the raw oils themselves or upon the fatty acids or their esters after separation from the other constituents of the oil. The esters of such acids may be treated with very desirable results.

The fatty acids which may be used alone or as mixtures in accordance with this invention are such as may be obtained by saponification of these oils.

Although any mild oxidizing agent may be used in the processes of this invention, hydrogen peroxide is preferred because of the ease with which it may be utilized.

While it is not desired to limit the invention to any specific theory it is believed that the treatment of the highly unsaturated fatty acid radicals with the regulated proportions of mild oxidizing agents produces saturation of some but not all of the unsaturated carbon linkages by the addition of hydroxyl groups. Subsequent reaction of the hydroxylated bodies with acetic anhydride or other acylating agents produces peracylated substances. Subsequent reaction of these substances with strong sulphonating agents such as described in the examples most probably produces a product which is not, or not entirely, a sulphuric ester, but is, at least in part, a true sulphonic acid.

Whatever may be the exact chemical constitution of these products, their properties are superior to those of the ordinary Turkey red oils in that they exhibit a superior stability to lime and to acids. Their general uses are similar to those of the Turkey red oils; thus, they may be used as wetting and softening agents in the treatment of textile fibers.

As many apparently widely different embodiments of this invention may be made without departing from the spirit and scope of the invention, it is to be understood that we do not limit ourselves to the specific embodiments thereof except as defined in the appended claims.

We claim:

1. A process for the manufacture and production of new oxidized oils which comprises heating a highly unsaturated vegetable or animal oil or a fatty acid thereof with a regulated proportion of a mild oxidizing agent and an acylating agent to effect peracylation, and subsequently sulphonating.

2. The process which comprises heating a substance containing a chemical compound having a highly unsaturated fatty acid radical with a mild oxidizing agent and an acylating agent to effect peracylation, and reacting the product with a sulphonating agent of greater sulphonating power than 100% sulphuric acid.

3. The process which comprises heating a substance containing a chemical compound having a highly unsaturated fatty acid radical, with hydrogen peroxide and an acylating agent to effect peracetylation, and reacting the product with a sulphonating agent of greater sulphonating power than 100% sulphuric acid.

4. The process which comprises heating a substance containing a chemical compound having a highly unsaturated fatty acid radical, with hydrogen peroxide and an acetylating agent to effect peracetylation, and reacting the product with a sulphonating agent of greater sulphonating power than 100% sulphuric acid.

5. The process which comprises heating a substance containing a chemical compound having a highly unsaturated fatty acid radical, with hydrogen peroxide and an acetylating agent in sufficient amount to partly peracetylate said compound, and reacting the product with a sulphonating agent of greater sulphonating power than 100% sulphuric acid.

6. The process which comprises heating a substance containing a chemical compound having a highly unsaturated fatty acid radical, with a peracylating agent in sufficient amount to partly peracylate said compound, and reacting the resultant product with a sulphonating agent of greater sulphonating power than 100% sulphuric acid.

7. The process which comprises heating a highly unsaturated oil with a mild oxidizing agent and an acylating agent to effect peracylation, and reacting the product with a sulphonating agent of greater sulphonating power than 100% sulphuric acid.

8. New oxidized and sulphonated products which are obtainable by heating a substance selected from the group consisting of unsaturated animal oils, unsaturated vegetable oils, unsaturated fatty acids, and unsaturated fatty acid esters with a mild oxidizing agent and an acylating agent to effect peracylation, and subsequently sulphonating.

9. New oxidized and sulphonated products which are obtainable by heating a substance selected from the group consisting of unsaturated animal oils, unsaturated vegetable oils, unsaturated fatty acids and unsaturated fatty acid esters with hydrogen peroxide and an acylating agent to effect peracylation, and subsequently sulphonating.

10. New oxidized and sulphonated products which are obtainable by heating a substance selected from the group consisting of unsaturated animal oils, unsaturated vegetable oils, unsaturated fatty acids and unsaturated fatty acid esters with hydrogen peroxide and an acylating agent to effect peracylation, and reacting the resultant product with a sulphonating agent of greater sulphonating power than 100% sulphuric acid.

11. New oxidized and sulphonated products which are obtainable by heating a substance selected from the group consisting of unsaturated animal oils, unsaturated vegetable oils, unsaturated fatty acids and unsaturated fatty acid esters with hydrogen peroxide and acetic acid in sufficient amount to partially peracetylate the substance treated, and then reacting the resultant product with a sulphonating agent of greater sulphonating power than 100% sulphuric acid, at a relatively low temperature.

12. New oxidized and sulphonated products which are obtainable by heating a substance selected from the group consisting of unsaturated animal oils, unsaturated vegetable oils, unsaturated fatty acids and unsaturated fatty acid esters with a peracetylating agent in sufficient amount to partially peracetylate the substance treated and then reacting the resultant product with a sulphonating agent and pyridine, at a relatively low temperature.

13. As new products of manufacture, sulphonated peracylated unsaturated fish oils.

14. As new products of manufacture, oils containing unsaturated fatty acid glycerides which have been heated with a peracetylating agent to effect partial peracetylation thereof, and then sulphonated.

15. As new products of manufacture, fish oils containing unsaturated fatty acid glycerides which have been heated with a peracetylating agent to effect partial peracetylation thereof, and then sulphonated.

16. As new products of manufacture, sulphonated peracetylated unsaturated oils being obtainable by heating oils containing unsaturated fatty acid glycerides with a peracetylating agent to effect partial saturation thereof, and then sulphonating with oleum containing at least 20% $SO_3$, at a relatively low temperature.

17. As a new product of manufacture, linseed oil which has been heated with a peracetylating agent to effect partial peracetylation thereof, and then sulphonated with a sulphonating agent of greater sulphonating power than 100% sulphuric acid, at a relatively low temperature.

18. As a new product of manufacture, a highly unsaturated fish oil which has been heated with hydrogen peroxide and glacial acetic acid in sufficient amount to effect partial saturation thereof, and subsequently sulphonated with oleum containing about 20% $SO_3$, at relatively low temperatures.

19. New oxidized and sulphonated products which are obtainable by heating an unsaturated fatty acid with hydrogen peroxide and an acylating agent to effect peracylation thereof, and subsequently sulphonating the resultant product.

ANTHONY JAMES HAILWOOD.
RICHARD PATRICK McGLYNN.

CERTIFICATE OF CORRECTION.

Patent No. 1,926,769.   September 12, 1933.

ANTHONY JAMES HAILWOOD, ET AL.

It is hereby certified that error appears in the printed specification of the above numbered patent requiring correction as follows: Page 1, line 39, Example 2, for "40" read 400; page 2, line 62, claim 3, for "peracetylation" read peracylation; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.

agent to effect partial peracetylation thereof, and then sulphonated.

16. As new products of manufacture, sulphonated peracetylated unsaturated oils being obtainable by heating oils containing unsaturated fatty acid glycerides with a peracetylating agent to effect partial saturation thereof, and then sulphonating with oleum containing at least 20% $SO_3$, at a relatively low temperature.

17. As a new product of manufacture, linseed oil which has been heated with a peracetylating agent to effect partial peracetylation thereof, and then sulphonated with a sulphonating agent of greater sulphonating power than 100% sulphuric acid, at a relatively low temperature.

18. As a new product of manufacture, a highly unsaturated fish oil which has been heated with hydrogen peroxide and glacial acetic acid in sufficient amount to effect partial saturation thereof, and subsequently sulphonated with oleum containing about 20% $SO_3$, at relatively low temperatures.

19. New oxidized and sulphonated products which are obtainable by heating an unsaturated fatty acid with hydrogen peroxide and an acylating agent to effect peracylation thereof, and subsequently sulphonating the resultant product.

ANTHONY JAMES HAILWOOD.
RICHARD PATRICK McGLYNN.

CERTIFICATE OF CORRECTION.

Patent No. 1,926,769.  September 12, 1933.

ANTHONY JAMES HAILWOOD, ET AL.

It is hereby certified that error appears in the printed specification of the above numbered patent requiring correction as follows: Page 1, line 39, Example 2, for "40" read 400; page 2, line 62, claim 3, for "peracetylation" read peracylation; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.

CERTIFICATE OF CORRECTION.

Patent No. 1,926,769. September 12, 1933.

ANTHONY JAMES HAILWOOD, ET AL.

It is hereby certified that error appears in the printed specification of the above numbered patent requiring correction as follows: Page 1, line 39, Example 2, for "40" read 400; page 2, line 62, claim 3, for "peracetylation" read peracylation; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.